J. E. GOODMAN.
OPTOMETER.
APPLICATION FILED NOV. 27, 1908.
922,276.
Patented May 18, 1909.
3 SHEETS—SHEET 3.
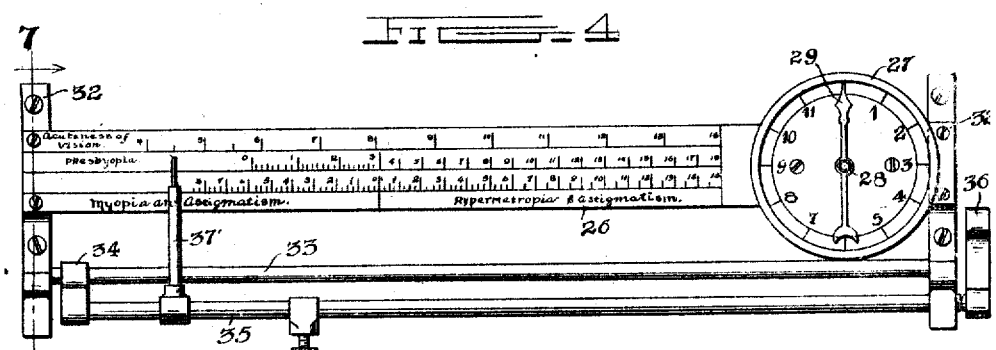
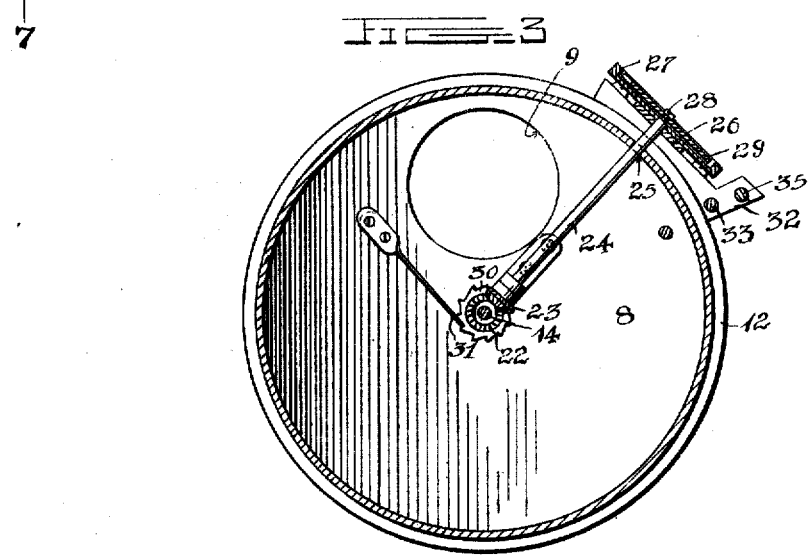
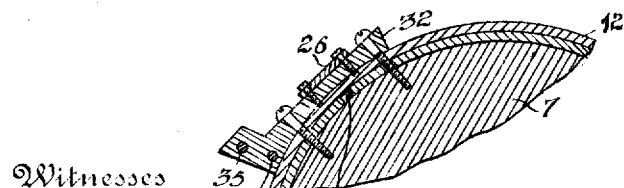
Inventor
J. E. Goodman

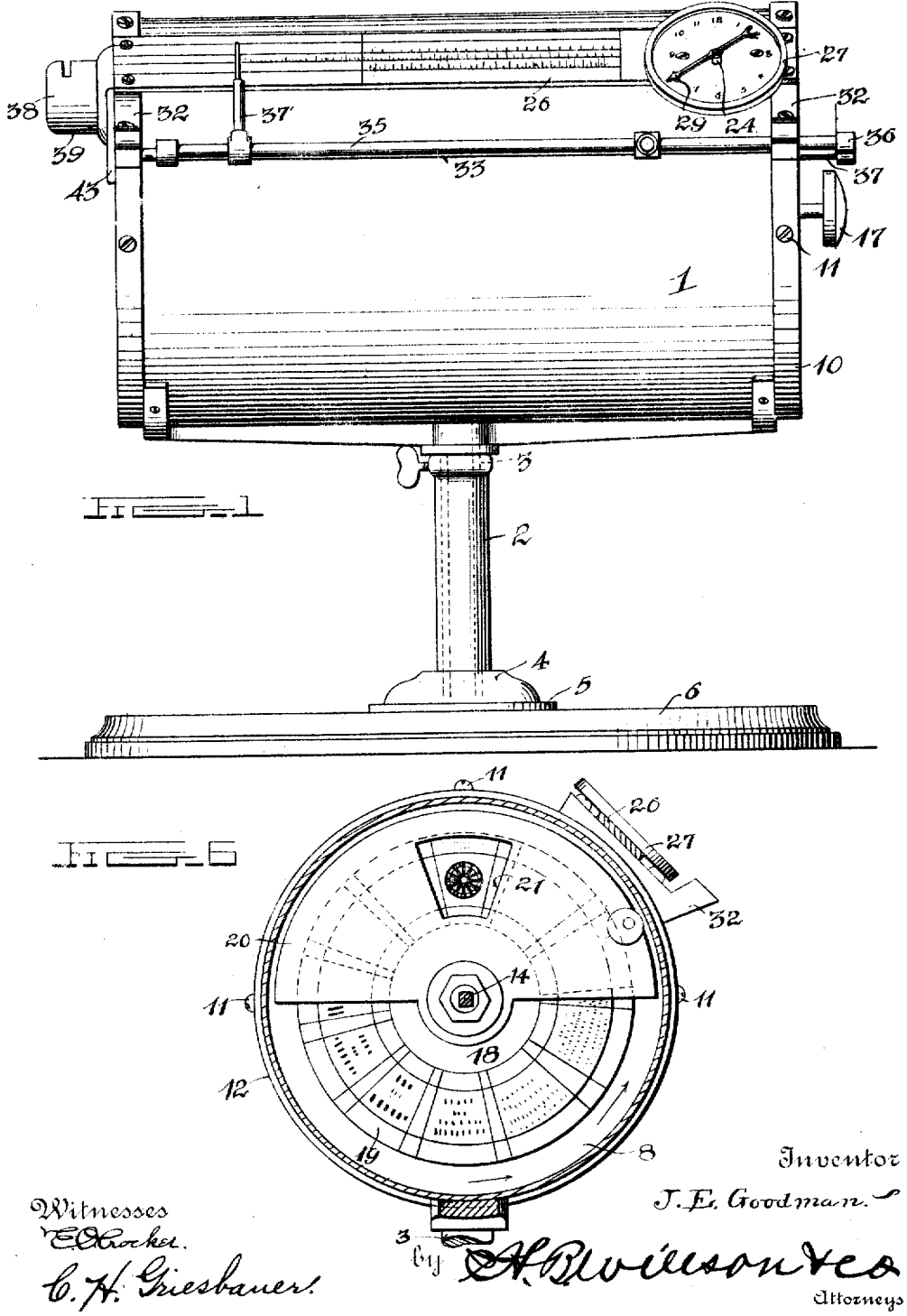

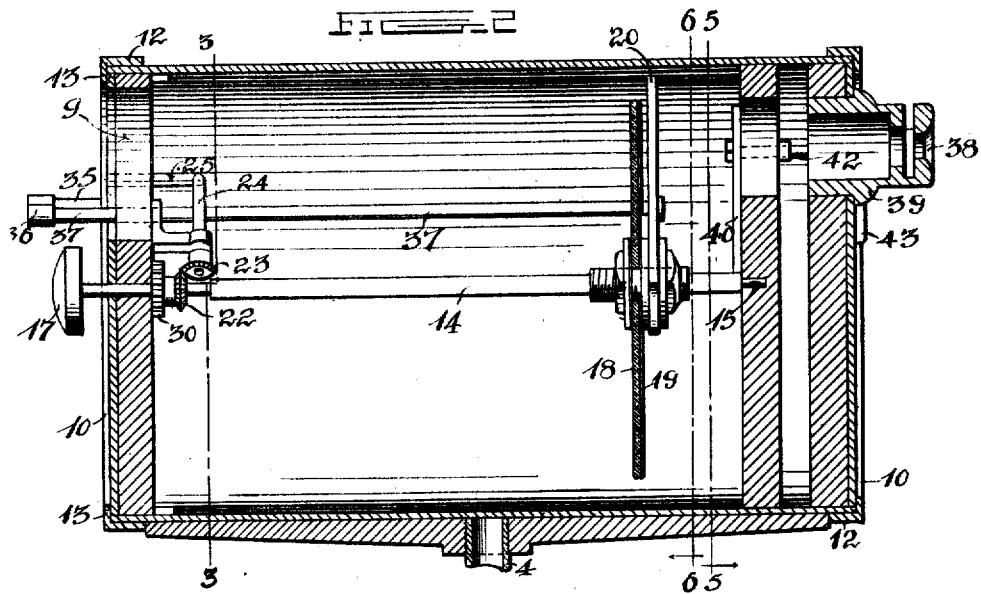
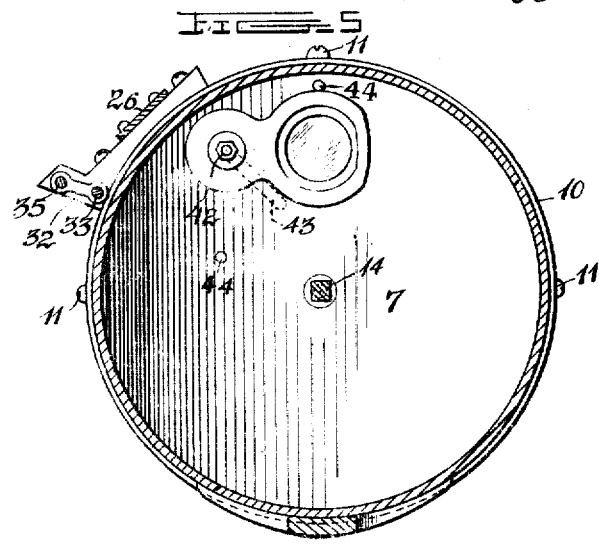
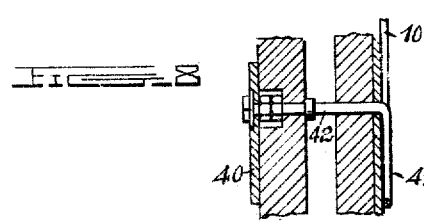

UNITED STATES PATENT OFFICE.

JACOB EUGENE GOODMAN, OF ATLANTA, GEORGIA.

OPTOMETER.

No. 922,276.　　　Specification of Letters Patent.　　　Patented May 18, 1909.

Application filed November 27, 1908. Serial No. 464,623.

*To all whom it may concern:*

Be it known that I, JACOB EUGENE GOODMAN, a citizen of the United States, residing at Atlanta, in the county of Fulton and State of Georgia, have invented certain new and useful Improvements in Optometers; and I do declare the following to be a full, clear, and exact description of the invention, such as will enable others skilled in the art to which it appertains to make and use the same.

This invention relates to an optometer and has for its object to provide a new optical instrument of this kind by means of which the acuteness of vision may be readily found, and also the punctum remotum (far point of distant vision) and the punctum proximum (near point of distant sight) may be quickly determined. Also if the eye has two puncta remota (astigmatism) this device locates each of them and the meridians in which they lie; myopia, hypermetropia, astigmatism and the amplitude or range of accommodation can all be quickly and accurately measured and recorded in diopters and fractions thereof, thus doing away with all distance measurements.

A secondary object of the invention is to provide an optical instrument of this class which is exceedingly simple in construction, considering the many uses for which it is adapted, easily operated and inexpensive.

With these and other objects in view, the invention consists of certain novel features of construction, combination and arrangement of parts as will be more fully described and particularly pointed out in the appended claims.

In the accompanying drawings, Figure 1 is a side elevation of an optometer embodying my improvements; Fig. 2 is a central longitudinal section taken through the device; Fig. 3 is a transverse section taken on line 3—3 of Fig. 2; Fig. 4 is a detail fragmentary view of the indicating and recording means; Fig. 5 is a transverse section taken through the cylinder in advance of the indicating disk; Fig. 6 is a similar view looking in the opposite direction; and Fig. 7 is a transverse section taken on line 7—7 of Fig. 4; Fig. 8 is a fragmentary sectional view of the operating means for the pivoted lens.

In the embodiment illustrated, the device comprises a hollow cylindrical tube or casing 1 of opaque material which is mounted upon a longitudinal support 2 carried by the upper end of a cylindrical standard 3 revolubly mounted in the tubular extension 4 of a support 5 screwed or other wise fixedly mounted upon a flat supporting base 6. The ends of the cylinder or casing 1 are closed in by front and rear end walls 7 and 8, respectively, the latter being provided with a suitable opening 9 to permit the passage of a beam of light into the rear end of the casing. These walls are held in position by cylindrical hoops or bands 10 which are held in position by screws 11 which screw through the bodies 12 of the hoops or bands through the ends of the casing 1 into the perimeters of the end walls, the hoops or bands being provided at their outer edges with inwardly extending rims 13 which engage the ends of the casing. A disk supporting shaft 14 is arranged centrally and longitudinally within the casing, said shaft being of square form in cross section and provided at its front end with a circular extension 15 which is journaled in the front end wall 7 and with a similar but longer extension at its rear end which extends through and beyond the rear end wall and has screwed to its extreme rear end an operating handle 17 which, as shown, is in the form of a disk.

A transparent indicating disk 18, preferably of glass, and of a diameter somewhat less than the internal diameter of the casing, is slidably mounted upon the shaft 14 in any suitable or well known manner, the front face of the disk being provided with a circular strip 19 of opaque material, preferably paper, upon which are printed twelve groups of suitable indicia of graduated sizes. A metallic guard plate 20 of semi-circular form and a size to closely fit within the casing or cylinder is arranged in front of and at the upper half of the indicating disk and is provided with a central opening 21 with which is adapted to register any one of the groups of indicia. The object of this guard is to prevent the patient from seeing more than one group of indicia at a time.

A bevel gear 22, is arranged at the rear end of the shaft 14 and intermeshes with a second bevel gear 23 arranged at the inner end of a shaft or spindle 24, the outer end of which extends through a longitudinal slot 25 formed in the rear end of the cylinder or casing 1 and through the adjacent end of a scale 26 and a circular indicating disk 27 attached thereto, the outer end of the spindle extending beyond the disk 27 and having secured thereto by a nut 28 an index 29. The shaft 14 may be turned one-twelfth of a revolution at a time to successively dispose or bring the several groups of indicia into registration with the opening 21 of the metallic guard 20 and to cause the index 29 to move one-twelfth of a revolution over the face of the disk 27 by means of the handle 17. In order to insure that the shaft 14 will turn but a quarter of a revolution at a time and in order that it may be held at any desired point, a ratchet wheel 30, having twelve teeth, is arranged at the rear end thereof, and a flat spring 31 is attached to the inner face of the rear end wall in position to engage the teeth of said ratchet.

The ends of the scale 26 are screwed to supporting plates 32 which are in turn screwed to the bodies of the hoops or bands 10. A cylindrical rod 33 is arranged between the lower ends of the plates 32 and forms a track for the inner end of a slide 34, to the outer end of which is connected an index carrying rod 35 which is disposed in longitudinal and parallel relation with the rod 33 and extends through the lower end of the rear supporting plate 32. The rear end of the rod 35 is provided with an inwardly extending arm 36, to the inner end of which is connected the rear end of an operating rod 37 which extends through the rear end wall 8 and is screwed or otherwise attached at its front end to the metallic guard 20.

From the foregoing, it will be seen that the indicating disk 18 may be moved or slid upon its track, which in this case is the shaft 14, by means of the operating rod 35, the relative position of the indicating disk being indicated by an index 37' carried by the former. The scale bar 26 is provided with a lower scale to indicate myopia and astigmatism, and hypermetropia and astigmatism, and a second scale to indicate presbyopia.

An eye tube 38 provided with a cylindrical body 39 is slid into the front wall of the casing and a lens 40 is arranged in the inner end of a frame 41 fixed to the inner end of an operating shaft 42 provided at its front end with an operating handle 43, the frame being arranged in position to dispose the lens immediately in front of the body of the eye tube when the operating handle is swung inwardly to the maximum extent, the extent of the swinging movement of the lens carrying arm being limited in both directions by stops 44 on the inner face of the front end wall of the casing.

In practice, the lens having been swung into a position out of registration with the eye tube and the operating shaft 14 having been turned to dispose the stigmatic chart into registration with the opening of the guard 20, the patient looks into the eye tube with the naked eye at the chart and if this is not clearly and distinctly seen by him, the shaft 14 is turned a twelfth of a revolution at a time to dispose the successive groups of indicia into registration with the opening of the guard 20 until such a group has been brought into position as may be clearly and distinctly read by the patient. At each one-twelfth of a revolution of the shaft 14 and indicating disk, the index 29 is moved a corresponding fraction of a revolution over the dial 27 by the means heretofore described and by this means, the acuteness of vision may be readily determined. To measure myopia (near sight) or hypermetropia (far sight), the indicating disk is started at the extreme rear end of the cylinder and is gradually moved toward the eye until the stigmatic chart first becomes distinct or readable; in other words, the most remote point at which it is possible to see this chart clearly is found. The point so found is the punctum remotum (far point of distant vision) as shown by the instrument and indicates the refraction of the eye for distant vision. If the point so found lies beyond zero on the right hand side of the bar, the eye is hypermetropic and requires for its correction a plus (convex) lens of a power indicated by the position of the index 29 on the scale. If the point so found lies between zero and the eye tube, the eye is myopic and requires for its correction a minus (concave) lens of a power indicated by the position of the index. As is a well known fact, the strongest possible plus and the weakest possible minus lenses should be chosen for distant vision glasses. Astigmatism is measured at the same time as myopia and hypermetropia. The outer end of the eye tube is provided with a slot 30 to receive a concave lens of the desired strength, (which would usually be 6 dioptres) to increase the range of the instrument when measuring myopia or accommodation. A scale is also arranged at the upper edge of the scale bar, which, when measuring acuteness of vision, provides a means for determining the distances in inches which the indicating disk is located from the eye of the patient.

From the foregoing description taken in connection with the drawings, it is thought that the construction and operation of the invention will be readily appreciated by those skilled in the art to which the invention appertains.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent is:

1. In an optometer, a supporting base, a closed cylinder revolubly mounted thereon, a supporting shaft extending centrally and longitudinally through the cylinder, an indicating disk provided with groups of indicia of graduated sizes arranged on the shaft, a guard plate provided with a central opening arranged in front of and at the upper half of the indicating disk, and means under the control of the operator for intermittently turning said shaft to successively dispose the several groups of indicia on the indicating disk in registration with the opening of the guard plate.

2. An optometer comprising an opaque cylinder having alined sight and light openings, testing means mounted for rotary and longitudinal adjustment within said cylinder and having graduated indicia thereon, means to aline the indicia with the light and sight openings of the cylinder and means to focus the same.

3. In an optometer, an opaque cylinder having alined sight and light openings, an indicating disk having graduated indicia arranged within the cylinder, means for intermittently turning said disk to aline the indicia with the light and sight openings, and means to focus the disk.

4. In an optometer, an opaque cylinder having alined sight and light openings, a disk supporting shaft arranged longitudinally therein, an indicating disk having graduated indicia and slidably mounted upon said shaft, means under the control of the operator for intermittently turning the shaft a fraction of a revolution to visionally aline the indicia of said disk, and means for adjusting the disk longitudinally upon the shaft to focus the indicia.

5. In an optometer, an opaque cylinder having alined sight and light openings, an indicating disk having graduated indicia and mounted for longitudinal adjustment in the cylinder, means under the control of the operator for intermittently turning the disk a fraction of a revolution to visionally aline the indicia, and a lens pivotally mounted in the cylinder in position to swing into alinement with the sight opening.

6. In an optometer, an opaque cylinder having alined sight and light openings, an indicating disk having graduated indicia and mounted for longitudinal adjustment in the cylinder, means under the control of the operator for intermittently turning the disk a fraction of a revolution to visionally aline the indicia, a lens pivotally mounted in the cylinder in position to swing into alinement with the sight opening, and means to indicate the position of the indicating disk with relation to the cylinder and the positions of the graduated indicia thereof.

7. In an optometer, an opaque cylinder having alined sight and light openings, a transparent indicating disk having graduated indicia and mounted for longitudinal adjustment thereon, means under the control of the operator for intermittently turning said disk a fraction of a revolution to visionally aline the indicia thereof, and means for indicating the longitudinal position of the disk in the cylinder, said means comprising a graduated scale arranged at the exterior of the cylinder, and an operating rod connected with the disk and provided with an index disposed over the scale, mounted for longitudinal adjustment beneath the latter.

8. An optometer comprising an opaque cylinder having alined light and sight openings, and testing means mounted for rotary and longitudinal adjustment within said cylinder.

In testimony whereof I have hereunto set my hand in presence of two subscribing witnesses.

JACOB EUGENE GOODMAN

Witnesses:
E. EDMONSTON, Jr.,
J. P. DUFFIE.